United States Patent [19]

Calmettes et al.

[11] Patent Number: 5,144,726
[45] Date of Patent: Sep. 8, 1992

[54] CLAMP HAVING A RESERVE OF CAPACITY

[75] Inventors: Lionel Calmettes; Michel André, both of Romorantin Lanthenay, France

[73] Assignee: Establissements Caillau, France

[21] Appl. No.: 696,602

[22] Filed: May 7, 1991

[30] Foreign Application Priority Data

May 23, 1990 [FR] France .................. 90 06477

[51] Int. Cl.$^5$ ............................................. B65D 63/02
[52] U.S. Cl. ....................................... 24/20 R; 24/20 S; 24/20 TT
[58] Field of Search ............ 24/20 R, 20 CW, 20 EF, 24/20 TT, 20 S, 23 R, 23 EE

[56] References Cited

U.S. PATENT DOCUMENTS

| 3,402,436 | 9/1968 | Oetiker | 24/20 CW |
| 4,987,652 | 1/1991 | Spaulding | 24/20 R |
| 4,998,326 | 3/1991 | Oetiker | 24/20 R |

FOREIGN PATENT DOCUMENTS 1091821 10/1960 Fed. Rep. of Germany .
2616879 12/1988 France .

Primary Examiner—James R. Brittain
Attorney, Agent, or Firm—Marshall & Melhorn

[57] ABSTRACT

A clamp is disclosed, constituted by a metal band wound on itself, of which the ends are respectively provided with complementary fastening means adapted to be coupled to each other when a tool, for example pliers, is tightening the clamp. The clamp is further provided with an undulation forming a reserve of capacity and being deformable by flattening during tightening. In the zone of connection of the undulation to the band, located towards the inner end of the band, there is provided a gusset for reinforcing this zone of connection.

5 Claims, 1 Drawing Sheet

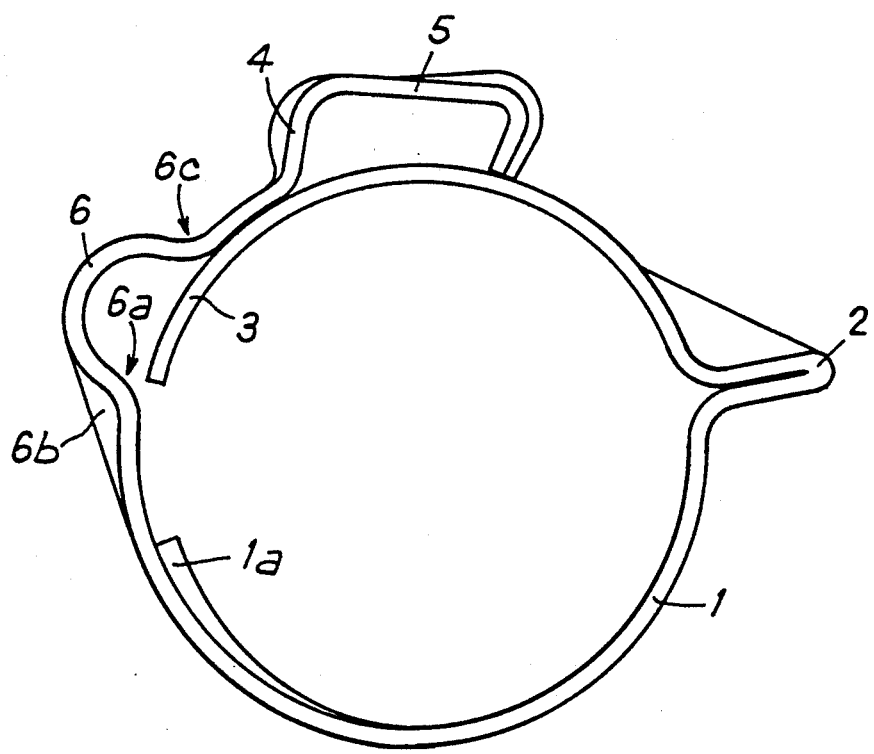

CLAMP HAVING A RESERVE OF CAPACITY

FIELD OF THE INVENTION

The present invention relates to a clamp having a reserve of capacity.

BACKGROUND OF THE INVENTION

Patent FR-A-2 470 275 in particular already discloses a clamp constituted by a band of metal wound on itself and presenting at its two ends complementary means for tightening and fastening the clamp in the tightened position. This prior Patent proposes providing, in the band constituting the clamp, an undulation extending over the whole width of the band and projecting outwardly. It makes it possible to give the clamp, after it has been mounted and tightened on a hose pipe, the capacity elastically to deform its periphery in the sense of a reduction in its length. The clamp may thus be adapted to a reduction in the outer periphery of the hose pipe, for example in the event of the material of said pipe creeping, whilst continuing to exert thereon a sufficient tightening force. This type of clamp is frequently called a "clamp having a reserve of capacity".

However, two drawbacks of this type of clamp have been observed.

On the one hand, particularly in the case of small-diameter clamps, the tool which is intended to tighten and fasten the two ends of the clamp abuts on the undulation instead of coming into contact with the stops allowing tightening. The tightening and fastening operation is thus more difficult.

On the other hand, if the clamp has to present a large "reserve of capacity", the radial projection of the undulation may attain prohibitive dimensions and it is not always possible to provide two or more undulations. This will be the case in particular if continuity of the inner periphery of the clamp must be maintained, for example by means of a suitable extension of the inner end of the band constituting the clamp.

Patent FR-A-2 616 879 has already proposed a first solution which partly overcomes the drawbacks which have just been set forth, but this solution cannot always be used in view of the increasingly strict requirements of the art.

Furthermore, Patent DE-A-1 091 821 proposes reinforcing an undulation of the band by means of a longitudinal rib, located in the vicinity of the crest of the undulation and extending substantially symmetrically with respect to this crest.

This solution does not avoid the drawbacks set forth hereinabove and, in particular, generally does not provide a "reserve of capacity" corresponding to the present requirements of the art.

Finally, it is obvious that the application of the solution proposed by this German Patent to the clamps according to one or the other of the French Patents mentioned hereinbefore, does not solve the two technical problems mentioned above.

It is therefore an object of the invention to provide a clamp with a reserve of capacity, of the type which has just been recalled, which eliminates its drawbacks whenever the first solution set forth is not suitable.

SUMMARY OF THE INVENTION

According to the invention, in the zone of connection of the undulation to the band, located towards the inner end of the band, there is provided a gusset for reinforcing this zone of connection.

BRIEF DESCRIPTION OF THE DRAWINGS

The invention will be more readily understood on reading the following description with reference to the accompanying drawings, in which:

The single FIGURE shows, on a large scale, a clamp according to the invention.

DETAILED DESCRIPTION OF THE DRAWINGS

Referring now to the drawings, the Figure shows a clamp of the type described in Patent FR-A-2 470 275. The metal band 1, wound on itself, comprises, in the vicinity of the inner end, a lug 2 constituted by a radial fold, which is connected to an extension 3 located beneath the outer end. This latter likewise comprises a lug 4, constituted by a radial fold provided with a hook 5.

Beyond lug 4, with respect to its hook 5, band 1 comprises an undulation 6 of which the radial projection is adjacent that of lug 4 and, preferably, at the most equal thereto.

In the zone of connection 6a of the undulation 6 to band 1, there is provided a gusset 6b, obtained for example by stamping the inner face of the band, preferably at the centre of its width. Gusset 6b is approximately defined, in the radial direction, by a straight line, tangential both to undulation 6 and to band 1 after the latter has been wound on itself.

It may be noted here that the zone of connection 6a is the one which, with respect to the apex of the undulation 6, lies towards that part of the band which constitutes the inner end, even if, in general, this zone 6a is advantageously remote from lug 2 and its extension 3. The terminal edge of the latter is in the form of a fork adapted to cooperate with a boss 1a radially projecting from the inner face of the band, as described in Patent EP-A-243 224.

For tightening the clamp, a tool of the pliers type bears on lug 2 and on lug 4 and brings them towards each other until hook 5, having passed over lug 2, fastens therebehind.

The presence of gusset 6b obviously prevents one of the jaws of the tool from abutting on undulation 6, this facilitating the tightening operation, particularly if the clamp is to be mounted in a zone where it will not be readily visible.

Furthermore, during the tightening operation, the zone of connection 6c, opposite zone 6a, deforms in the sense of an increase in its radius of curvature and undulation 6 flattens, at least as far as the origin of gusset 6b. On the contrary, the zone of connection 6a, reinforced by gusset 6b, generally conserves the shape given to it at manufacture. The deformations which have just been mentioned remain within the domain of the elasticity of the metal and normally do not cause any permanent local deformation of the clamp. The "reserve of capacity" thus created in the clamp may therefore be completely restored by the metal.

If, in certain cases, the clamp-tightening operation requires a very considerable effort, the radius of the zone of connection 6a will be slightly increased whilst gusset 6b itself extends somewhat by elastic deformation.

In this way, not only gusset 6b facilitates positioning of the clamp, but, in particular, it has been observed that it itself constitutes a "reserve of elasticity" quite suitable for maintaining the deformation of the undulation within the domain of elasticity of the metal and for rendering the "reserve of capacity" of the clamp completely efficient.

Although an embodiment has been described in which the complementary fastening means are of a particular type, it is obvious that the invention is applicable to all types of clamps "with a reserve of capacity".

What is claimed is:

1. A clamp comprising:
   a) a metal band wound on itself defining an inner end and an outer end and having complementary fastening means on the inner end and the outer end of said metal band, the fastening means engageable by a tightening tool and adapted to be coupled to each other when tightened about an object to be clamped;
   b) an undulation in said metal band spaced from the fastening means of the outer end; and
   c) a gusset formed adjacent to said undulation on only one side thereof, said gusset including a linear edge extending tangentially from said undulation to said metal band toward the inner end.

2. The clamp defined in claim 1 wherein said fastening means includes a lug hook at the outer end of said metal band and a projecting lug near the inner end.

3. The clamp defined in claim 2 wherein said undulation is adjacent to the lug hook of said metal band.

4. The clamp defined in claim 1 wherein said gusset includes a linear edge tangent to said undulation and to said metal band.

5. The clamp defined in claim 1 wherein said gusset includes a longitudinal rib.

* * * * *